Sept. 16, 1969  E. J. SCHNEIDER  3,467,127
FAST ACTING FLUID RESPONSIVE VALVE
Filed Oct. 3, 1967  2 Sheets-Sheet 1
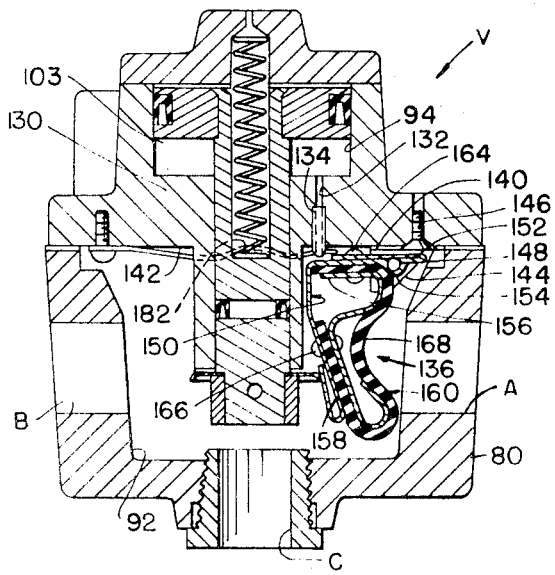
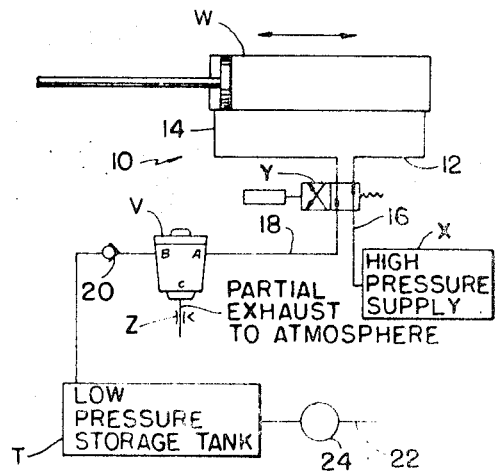
INVENTOR
ERVIN J. SCHNEIDER
BY Whittemore Hulbert & Belknap
ATTORNEYS Sept. 16, 1969  E. J. SCHNEIDER  3,467,127
FAST ACTING FLUID RESPONSIVE VALVE
Filed Oct. 3, 1967  2 Sheets-Sheet 2

INVENTOR
ERVIN J. SCHNEIDER

BY Whittemore, Hulbert &
Belknap
ATTORNEYS

United States Patent Office 3,467,127
Patented Sept. 16, 1969

3,467,127
FAST ACTING FLUID RESPONSIVE VALVE
Ervin J. Schneider, 13970 Forrer Ave.,
Detroit, Mich. 48227
Continuation-in-part of application Ser. No. 542,072,
Apr. 12, 1966. This application Oct. 3, 1967, Ser.
No. 672,564
Int. Cl. G05d *11/03;* F15b *11/00*
U.S. Cl. 137—117
16 Claims

ABSTRACT OF THE DISCLOSURE

The valve includes a body provided with first and second chambers, with the first chamber having inlet, outlet and exhaust ports. In use, the inlet port is connected to a work cylinder, the outlet port is connected to a storage tank, and the exhaust port is connected to atmosphere. An actuator in the second chamber includes an extension extending into the first chamber to which is connected a normally closed valve element for the exhaust port. Actuator control means, such as an orifice and an associated diaphragm, is located between the chambers and is responsive to the initial flow of fluid in an explosive condition from the cylinder for rendering the actuator inoperative to permit the transfer of fluid energy between the cylinder and storage tank. Such transfer takes place almost instantaneously in a relatively unrestricted manner in a relatively short period of time measured in milli-seconds. When the initial fluid flow from cylinder to tank terminates, the control means opens to permit flow across the orifice between the chambers. The fluid in the second chamber exerts an actuating force on the actuator so as to move the valve element away from the exhaust port and thereby permits the cylinder fluid to exit via the exhaust port. Cam means is carried by the extension in the first chamber and is engageable with the actuator control means after the exhaust port is opened to prevent the diaphragm from closing the orifice. When the pressure in the first chamber decreases, the actuator moves the valve element against the exhaust port to close same. The valve is then ready for another cycle.

Cross reference to related applications

The present invention is a continuation-in-part application of my copending application Ser. No. 542,072 now Patent No. 3,400,636 entitled "Pneumatic Circuit for Rapidly Transferring Fluid Under Pressure from a Work Cylinder to a Storage Tank for Subsequent Use," filed Apr. 12, 1966.

BACKGROUND OF THE INVENTION

Field of the invention

The field of the invention is the same as that of my above-identified application, namely, a fast acting fluid responsive valve for use in a pneumatic circuit for rapidly transferring fluid under pressure from a work cylinder to a storage tank for subsequent use. Typical uses of the present invention are in any industry where pneumatic energy or fluid is utilized with various machines or machine tools, and where, due to certain economic factors, it is desirable to reclaim or store exiting pneumatic fluid energy from a work cylinder rather than exhausting such fluid to the atmosphere as wasted energy.

Description of the prior art

In the past it has been the general practice of the industry to exhaust the expended pneumatic energy from a work cylinder directly to the atmosphere. In some cases the expended energy is allowed to blow out chips or parts in fixtures. In addition, early steam engines utilized a high pressure piston and cylinder which exhausted the high pressure steam into a low pressure cylinder at a synchronized rate. The low pressure cylinder utilized approximately one-half of the stored energy in the high pressure cylinder rather than having the energy exhausted to the atmosphere as lost energy. With such a device the low pressure piston was mechanically tied to the high pressure piston rod through a fly wheel and special valving, which caused the high and low pressure pistons to work in a synchronized manner. The same type of system has been applied to air hammers which utilize high and low pressure piston and cylinder devices. The modern jet engine is another example of a synchronized use of high pressure and low pressure gas or fluid. The high pressure gases work on the small diameter turbine blades and as the gas expands it progressively passes onto the larger turbine blades all mounted on a common shaft, so that they work in a synchronized manner.

SUMMARY OF THE INVENTION

It is an object of the present invention to provide a fast acting fluid responsive valve for transferring the exiting pneumatic fluid expended from a work cylinder to a storage tank or to a second work cylinder almost instantaneously in a period of time measured in milli-seconds, with such cylinders being operated independently of each other in a non-synchronized manner or relationship.

Another object of the present invention is to provide a fast acting fluid responsive valve adapted to be incorporated in a pneumatic circuit or system which transfers expended energy from a work cylinder to a storage tank without interfering with the speed and operation of the primary work cylinder.

A further object of the present invention is to provide a fast acting fluid responsive valve adapted to be incorporated in a pneumatic circuit or system in which the instantaneous transfer of pneumatic fluid from the work cylinder to a storage tank is accomplished or characterized by an explosive type of action.

A still further object of the present invention is to provide a fast acting fluid responsive valve comprising a body having a first chamber provided with an inlet port, an outlet port and an exhaust port, a second chamber in the body, a valve element in the first chamber for controlling flow across the exhaust port, an actuator in the second chamber extending into the first chamber, said actuator being attached to the valve element and maintaining the valve element and the exhaust port in a closed position when the actuator is inoperative, and control means interposed between the chambers, said control means being responsive to the initial flow of fluid in an explosive condition for rendering the actuator inoperative to permit flow through the first chamber between the inlet and outlet ports, said control means upon termination of flow through the outlet port permitting fluid to enter the second chamber and operate the actuator which is effective to move the valve element and open the exhaust port and thereby permit flow to resume through the first chamber between the inlet and exhaust ports.

Another object of the present invention is to provide a fast acting fluid responsive valve of the aforementioned type wherein the control means includes an orifice between the first and second chambers and a sealing element for opening and closing the orifice.

Still another object of the present invention is to provide a fast acting fluid responsive valve of the aforementioned type wherein the control means includes an orifice between the chambers and a movable diaphragm assembly in the first chamber associated with the orifice for opening and closing same.

A further object of the present invention is to provide a fast acting fluid responsive valve of the aforementioned type wherein cam means is provided on said actuator in said first chamber, said cam means being engageable with the diaphragm assembly after the exhaust port is open to prevent the diaphragm assembly from closing the orifice.

It is thus another object of the present invention to provide a simplified low cost valve of the aforementioned type having certain advantages contributing to efficiency, reliability and long life as well as ease of maintenance.

Further objects and advantages of the present invention will be apparent from the following description, reference being had to the acompanying drawings wherein a preferred form of the present invention is clearly shown.

BRIEF DESCRIPTION OF THE DRAWINGS

FIGURE 1 is a schematic view of a pneumatic circuit for storing exiting pneumatic energy expended from a work cylinder.

FIGURE 2 is a schematic view of another pneumatic circuit for storing exiting pneumatic energy expended from a work cylinder.

FIGURE 3 is a schematic view of still another pneumatic circuit for storing exiting pneumatic energy expended from a work cylinder.

FIGURE 4 is a schematic view of a pneumatic circuit incorporating a pair of work cylinders, a fast acting fluid responsive valve and a pair of control valves, with said circuit functioning as a sequence circuit based on air flow.

FIGURE 10 is a sectional view, similar to FIGURE 7, and illustrating the valve element for the exhaust port in an open position.

DESCRIPTION OF A PREFERRED EMBODIMENT

Figure 9:
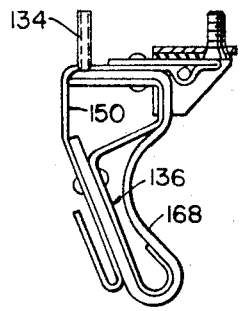
FIGURE 9 is a front view of the orifice and diaphragm assembly, illustrating the orifice in a closed position.
Figure 5:
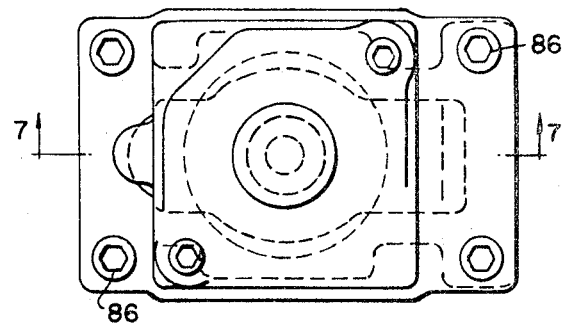
FIGURE 5 is a top view of one embodiment of the fast acting fluid responsive valve.

FIGURES 1–4 inclusive illustrate various pneumatic circuits in which the fast acting fluid responsive valve of the present invention may be utilized. Each of the pneumatic circuits incorporates the feature of flow or speed controlling the high pressure work cylinder after the explosive transfer of the expended pneumatic energy from the work cylinder to the storage tank has occurred. Where applicable the same letter and numerical designations are used to designate similar or equivalent components or parts.

The pneumatic circuit illustrated in FIGURE 1 is designated by the numeral 10 and includes a high pressure work cylinder W, a high pressure pneumatic source or supply X, a four-way directional control valve Y, and a low pressure storage tank T. The control valve Y may take various forms, it being understood that the valve Y may be operated by solenoids, electrically, manually, pneumatically, or by other means well known in the art.

The cylinder W is provided with a pair of cylinder lines 12 and 14 which terminate at the control valve Y. A high pressure supply line 16 is interposed between the control valve Y and the pressure supply X, and a low pressure or exhaust line 18 is interposed between the control valve Y and the storage tank T. Interposed in the low pressure line 18 between the control valve Y and tank T is the fast acting fluid responsive valve V, forming the subject matter of the present invention.

Valve V, which operates on a velocity or flow principle rather than on a pressure or pressure differential principle, includes an inlet port A, an outlet port B and an exhaust port C. A one-way acting ball check valve 20 is located between the valve V and the tank T. The storage tank T is provided with a low pressure supply conduit or line 22 having a control valve 24 therein. The line 22 may be connected, as an example, to a second work cylinder, not shown.

Referring once again to FIGURE 1, it will be observed that air under pressure from the supply X is directed through one port of the control valve Y and line 12 to the right side or chamber of the cylinder W so as to move the piston to the left to the position shown in FIGURE 1. At such time the pressurized fluid in the left side or chamber of the work cylinder W is forcibly urged out of said chamber through cylinder line 14 to the storage tank T, via the control valve Y, ports A and B of the valve V, and across the check valve 20. When the storage tank T is filled to capacity, as a result of the explosive transfer of the pneumatic energy, and the flow terminates in the outlet port B of valve V, exhaust port C is opened to permit the remaining quantity of the pneumatic fluid to be exhausted to atmosphere across the flow control Z as will be described in more detail later on in the specification. It will be appreciated that the speed at which the piston moves in the cylinder W is controlled by the flow valve Z which restricts the flow of air out of the left cylinder port of cylinder W. One flow control valve Z is provided for both the extended and retracted speeds of the work cylinder W.

When it is required to move the piston of the work cylinder W in the opposite direction, the control valve Y is energized so as to connect the supply X to the cylinder line 14 and to the left chamber of the cylinder W. The fluid exiting from the right chamber of cylinder W is directed through the cylinder line 12, control valve Y, valve V and the exhaust line 18 to the storage tank T, in the manner described heretofore, for subsequent use.

The transfer of pneumatic fluid from the work cylinder W to the storage tank T occurs almost instantaneously and is accompanied or characterized by an explosive type action. In order for the pneumatic circuit 10 to function properly the work cylinder W must function in normal sequence without any delay in the time cycle thereof. An important feature of the present invention is that the transfer of the compressed air energy, which is to be stored must take place in a relatively short period of time measured in milli-seconds. For this reason the air must be stored by an explosive action.

FIGURE 2 illustrates a pneumatic circuit 30 wherein the cylinder lines 12 and 14 of the work cylinder W are each provided with a three-way control valve Y' and Y'' respectively. The high pressure supply X is connected by a high pressure supply line 32 to the control valve Y'. The exhaust port of control valve Y' is provided with a low pressure or exhaust line 34 which terminates at the storage tank T and has interposed therein the valve V and check valve 20. A low pressure supply line 36, having a pressure regulating valve 38 therein, is interposed between the tank T and the control valve Y''. The exhaust port of the control valve Y'' is provided with a flow control valve 39.

The high pressure supply line 32 is connected to the low pressure storage tank T by a line 40 which is provided with a pressure regulating valve 42 and a check valve 44. The pressure regulating valve 42 permits high pressure fluid from the supply X to enter the storage tank T to precharge the tank T at the requisite minimum low pressure.

In operation, the high pressure fluid from the supply X enters the right side or chamber of cylinder W via the supply line 32, control valve Y' and the cylinder line 12 so as to move the piston to the left as illustrated in FIGURE 2. The pressurized fluid at the left side or chamber of work cylinder W is exhausted to atmosphere via the cylinder line 14, control valve Y'' and flow control valve 39. When it is required to move the piston of the work cylinder W to the right, the control valves Y' and Y'' are energized in the usual manner. As a result thereof, the storage tank T is connected to the left side or chamber of the cylinder W via the low pressure supply line 36, control valve Y" and cylinder line 14 so as to move the piston to the right. The pressurized fluid on the right side or chamber of the work cylinder W is forcibly exhausted therefrom via the cylinder line 12, control valve Y', exhaust line 34 and finally across valve V and check valve 20 to the tank T. Once the pressure between port B and tank T are balanced or equal, the flow through port B of valve V terminates as described previously permitting the remaining fluid from cylinder W to be exhausted to atmosphere across flow control Z.

FIGURE 3 illustrates a pneumatic circuit 46 which includes the component parts of pneumatic circuit 10 and in addition thereto includes a low pressure supply line 48 interposed between the high pressure line 16 and the low pressure storage tank T. Located in the supply line 48 is a one-way acting ball check valve 50 and an air compressor 52. Tank T is provided with a pressure switch 54. When the pressure in tank T reaches a predetermined value, the pressure switch 54 is energized so as to actuate a motor, not shown, for the compressor 52. As a result thereof, pressurized fluid from tank T is directed by compressor 52 through line 48 across the check valve 50 to the supply line 16. The supply line 48, compressor 52 and pressure switch 54 provide a means whereby the high pressure supply line 16 is supplemented with pressurized fluid from tank T when the value of the pressure in tank T exceeds a predetermined amount. In function, the circuit 46 operates in the same manner as pneumatic circuit 10.

In FIGURE 4 the pneumatic circuit 56 includes a pair of work cylinders W' and W", a four-way directional control valve, a three-way normally open valve Y", and valve V. Cylinder W' is provided with cylinder lines 58 and 60 terminating at the control valve Y'. Interposed in the cylinder line 60 is valve V as illustrated. Cylinder W" is provided with cylinder lines 62 and 64. Line 62 connects the left end or side of cylinder W" to port C of valve V. Line 64 terminates at the three-way control valve Y". A pilot line 66 connects line 62 to the pneumatic responsive control valve Y". The pressurized fluid source X is connected to each of the cylinders W and W" by high pressure supply lines 68 and 70 respectively.

The cylinders W' and W" function as a sequence circuit based on air flow as opposed to time or pressure differential. In operation, and with the component parts of the circuit 56 in the position illustrated in FIGURE 4, the directional control valve Y' is energized to move same to a second position where the pressure line 68 is connected by control valve Y' to ports A and B of valve V and to cylinder line 60 which in turn is connected to the right end or side of cylinder W'. At such time port C of valve V remains closed. The pressurized fluid from source X entering cylinder W' is effective to move the piston therein to the left. The fluid exiting from the left side of cylinder W' is discharged to atmosphere via cylinder line 58 and a port of control valve Y'.

As soon as the piston in cylinder W' has traveled all the way to the left, air flow through valve V and cylinder line 60 stops. As a result of the termination of flow, the diaphragm assembly in valve V is forced off its seat by a spring allowing the air to actuate a piston assembly in valve V which is effective to open port C as will subsequently be described.

The air then passes from source X, line 68 and control valve Y' through ports A and C of valve V into the pilot line 66 causing valve Y" to shift to its second position whereby the air on the right-hand side of the piston in cylinder W" is exhausted to atmosphere via the cylinder line 64 and the directional control valve Y". Line 70 is now blocked by control valve Y". This piston in cylinder W" is now free to move to the right as a result of the air from source X entering line 62 and the left side of cylinder W" via the exhaust port C. After the piston in cylinder W" has traveled all the way to the right, port C remains open.

The directional control valve Y' is then actuated and moved to its first position where air from source X is directed through line 68 and cylinder line 58 to the left side of cylinder W'. As a result thereof, the piston in cylinder W' is moved to the right, with the fluid on the right side of cylinder W' being exhausted to atmosphere via cylinder line 60, ports A and B of valve V and control valve Y'.

The back pressure of the air on valve V acting across port C and pilot line 66 prevents or keeps control valve Y" from shifting to its starting position. Therefore a sequence operation exists between cylinder W' and W" based on air flow only. As soon as all the air on the right side of cylinder W' is exhausted to atmosphere, the spring in the control valve Y" shifts same to its starting position.

As a result thereof the pressure line 70 is connected across control valve Y" to cylinder line 64 and the right side of cylinder W" causing the piston therein to tavel to the left to its starting position as illustrated. The fluid on the left side of cylinder W" is exhausted to atmosphere via line 62, ports C and A of valve V and the exhaust port of control valve Y'. Thereafter, port C is closed. The system or circuit 56 is then ready for another sequence cycle based on flow rather than on pressure differential or time.

Referring now to FIGURES 5–10 inclusive, the valve V includes a body 76 having a lower housing or part 78, an upper housing or part 80 and a cover 82. A gasket or seal 84 is interposed between the mating surfaces of the housing parts 78 and 80. Threaded bolts 86 are provided between the mating flanges of the upper and lower housings 78 and 80 at the four corners thereof to secure the housing parts together. The cover 82 is secured to the upper housing 80 by means of a pair of threaded bolts 86.

Figure 7:
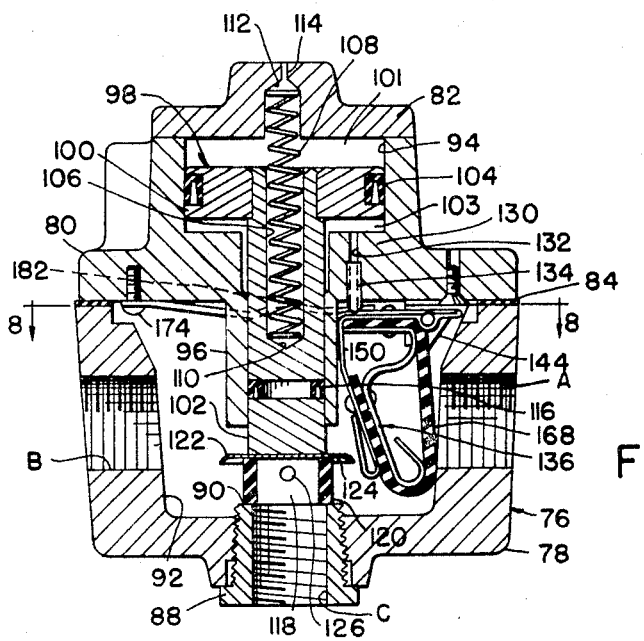
FIGURE 7 is a front sectional view of the valve taken substantially on the line 7—7 of FIGURE 5.

The lower housing 76 is provided with the inlet port A, outlet port B and the exhaust port C. The exhaust port C is provided in an externally threaded nipple or reducing bushing 88 which is screw threaded into the bottom of the housing part 78, as best illustrated in FIGURE 7. The bushing 88 is provided with a flat annular valve seat 90 on the inner end thereof. The lower housing 78 is provided with a first air chamber 92. Ports A, B and C are directly connected to the first air chamber 92.

The upper housing 80 is provided with a second air chamber 94 and a tubular extension or collar 96 which extends into the first air chamber 92. A fluid responsive actuator 98 is provided which includes a piston 100, located in the second air chamber 94, and a rod or extension 102 which extends through the tubular collar 96 into the first air chamber 92. The piston 100 is riveted or otherwise secured to the rod 102 and divides the air chamber 94 into an upper compartment 101 and a lower compartment 103. An annular cup seal 104 of transverse U-shaped cross section is provided in an annular groove located in the outer periphery of the piston 100 to provide a fluid tight fit with the chamber 94. The extension 102 includes an elongated cavity 106 in which is located a compression spring 108. The spring 108 is interposed between the bottom surface 110 of cavity 106 and the recessed surface 112 of the cover 82. The upper compartment 101 of chamber 94 is vented to atmosphere via the vent hole 114 provided in the cover 82.

A U-shaped seal 116, of transverse U-shape cross section, is provided in an annular groove located in the outer periphery of the piston rod 102 to provide a fluid tight fit with the internal bore of the tubular extension 96. The piston rod 102 is provided with a reduced end portion 118 to which is connected an annular valve element 120 and a cam disc 122. The cam disc or element 122 is inserted over the end portion 118 of rod 102 and abuts a shoulder 124, provided thereon. The valve element or poppet seal 120, as an example, may be made from a synthetic rubber tube. The valve element or seal 120 fits around the end portion 118 of rod 102 and is connected thereto by means of a retaining pin 126 which also holds the cam disc 122 in place. The spring 108 biases the actuator 98 in a direction to urge the valve element 120 against the valve seat 90 in order to close port C. When the valve element 120 is in a closed position the actuator 98 is in an inoperative position.

The upper housing 80 further includes a partition or wall 130 in which is located an orifice or elongated passage 132 extending between the lower compartment 103 of the second air chamber 94 and the first air chamber 92. The orifice 132 has a diameter of approximately 1/16" and is enlarged to approximately 1/8" at the end closest to chamber 92 in order to receive a tubular element 134 which, as an example, is made from brass. The tubular element has an outside diameter of 1/8" and an inside diameter of 1/16". The passage in the element 134 forms an extension of and is considered herein as a part of orifice 132. The lower and inner end of tubular element 134 extends into cavity 92 approximately 1/8".

A diaphragm assembly 136 is mounted in the first air chamber 92 and includes a retaining bracket 138 having a base 140, engageable with surface 142 of the upper housing 80, and a pair of depending side flanges 144 which are spaced apart. The base 140 is secured to the inner housing 80 by a threaded retaining screw or bolt 146. The spaced apart side flanges 144 are provided with aligned openings through which a pivot pin or bolt 148 extends for pivotally mounting a frame 150. The frame 150 includes a base 152 provided with a pivot mounting 154 for the pivot pin 148. The frame 150 further includes a pair of generally horizontal spaced arms 156 and a pair of generally vertically extending spaced arms 158. An elongated resilient diaphragm 160 made, as an example, from synthetic rubber, is mounted on and secured to the frame 150. The diaphragm 160 includes on one end thereof a leg portion which extends between the arms 156 and is secured thereto by a rivet 164 or other suitable fastening means. The other end of the diaphragm extends between the arms 158 on frame 150 and is secured thereto by a rivet 166 or other suitable fastening means. The intermediate portion 168 of the diaphragm 160 is spaced from the frame 150 and is adapted to flex and yield when subjected to pressurized fluid as will be subsequently described.

Figure 8:
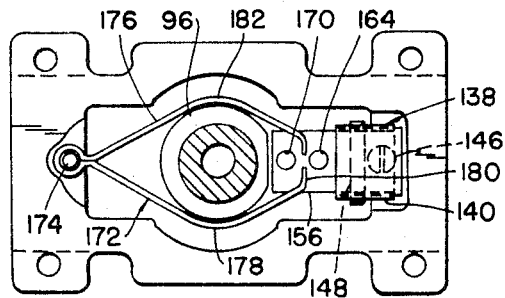
FIGURE 8 is a part sectional view of the valve taken substantially on the line 8—8 of FIGURE 7.
Figure 6:
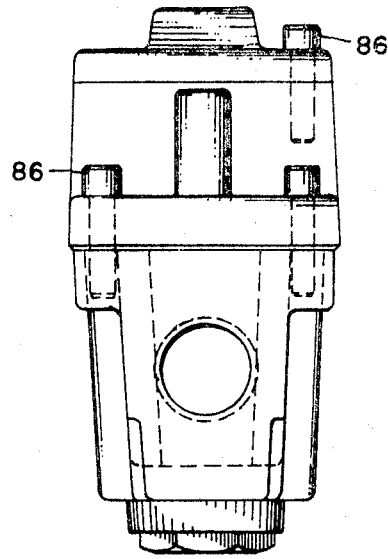
FIGURE 6 is a side elevation of the fast acting fluid responsive valve illustrated in FIGURE 5.

The top horizontal leg 156 of the frame 150, as best shown in FIGURE 8, is provided with a circular opening 170 in order to expose a portion of the diaphragm 160. The annular exposed portion of diaphragm 160 defines a seal or seal portion which is engageable with the tubular element 134 in order to close orifice 132 as will subsequently be described.

A spring 172 is mounted in the air chamber 92 by means of a threaded fastener 174. The spring 172 is engageable with the diaphragm assembly 136 and biases same away from the tube 134 to prevent closing of the orifice 132. The spring 172 comprises a pair of resilient arms 176 and 178 which extend around the tubular collar 96 and terminate in inwardly turned spring arms 180 engageable with the top leg 156 of the frame 150. The intermediate portions of the legs 176 and 178 are provided with raised nubs 182 which engage the inner surface 142 of the upper housing 80.

The orifice 132 and diaphragm assembly 136 provide a control device or means for the actuator or piston device 98 for rendering same operative or inoperative.

In operation, with the valve V in the normal or starting position shown in FIGURE 7, the first explosive blast of air exiting from the exhaust port of a directional control valve enters port A in an exposive manner and at approximately the speed of sound (600 miles per hour) and strikes and collapses the intermediate portion 168 of diaphragm 160. At this instant the diaphragm assembly 136 is rotated about pivot pin 148 to the position illustrated in FIGURE 9 in order to seal and close the orifice 132 and tubular element 134. Air is prevented from entering the orifice 132 and thus the lower compartment 103 of chamber 94 is sealed off from the in-coming air entering port A. At such time the spring 108 urges the actuator or piston device 98 and valve element 120 downwardly to urge the valve element 120 against the valve seat 90 in order to close the exhaust port C.

The air enters chamber 92, passes around the compressed diaphragm 160, and exits from chamber 92 in an unrestricted manner via outlet port B to the low pressure storage tank T or second work cylinder as described previously. The air flow to the storage tank T terminates when the pressure in tank T equals the incoming pressure of the air entering port A. At this instant the diaphragm assembly 136 is forced by spring 172 to return to its original or starting position thereby opening the orifice 132 and tubular element 134. The remaining air in chamber 92 then passes through the element 134 and orifice 132 into the lower compartment 103 of the chamber 94 thereby exerting a force on the actuator 98 which is effective to raise it and the valve element 120 to the open position shown in FIGURE 10. Thus the remaining exiting air from the work cylinder passes through inlet port A and exhaust port C of valve V to the atmosphere.

When exhaust port C is opened, the diaphragm portion 168 is again compressed as shown in FIGURE 10. However at this time the cam disc 122 engages the frame 150 and prevents the diaphragm 160 from closing and sealing the element 134 and orifice 132. The remaining air is exhausted out port C to the atmosphere. The air pressure in chamber 92 holds the exhaust port C in an open position until the pressure in chamber 92 drops or decreases to approximately 5 p.s.i. which is less than the force of spring 108. Spring 108 then forces the actuator 98 and valve element 120 to the closed position to block the exhaust port C. The entire action just described takes place in an explosive manner in a few milli-seconds of time and, as soon as the exhaust port C is sealed, the valve V is set for another cycle.

The action or function of the valve V is not dependent upon any synchronized action with any high or low pressure system, nor is it restricted to any pressure range, nor is it dependent upon any pressure differential. The diaphragm assembly 136 is actuated by the velocity or flow of air. It is important that ports A and B and chamber 92 be equal to or larger than the directional control valve which exhausts into port A.

The drawings and the foregoing specification constitute a description of the improved fast acting fluid responsive valve in such full, clear, concise and exact terms as to enable any person skilled in the art to practice the invention, the scope of which is indicated by the appended claims.

What I claim as my invention is:

1. A fast acting fluid responsive valve comprising a body having a first chamber provided with an inlet port, an outlet port and an exhaust port, a second chamber in said body, a valve element in said first chamber for controlling flow across said exhaust port, an actuator in said second chamber extending into said first chamber, said actuator being attached to said valve element and maintaining said valve element and said exhaust port in a closed position when said actuator is inoperative, and control means interposed between said chambers, said control means being responsive to the initial flow of fluid in an explosive condition for rendering said actuator inoperative to permit flow through said first chamber between said inlet and outlet ports, said control means opening upon termination of flow through said outlet port and thereby permitting fluid to enter said second chamber and operate said actuator which is effective to move said valve element and open said exhaust port to permit flow to resume through said first chamber between said inlet and exhaust ports.

2. The valve defined in claim 1 wherein said control means includes an orifice between said first and second chambers and a sealing element for opening and closing said orifice.

3. The valve defined in claim 1 wherein said control means includes an orifice between said first and second chambers and a movable diaphragm assembly in said first chamber associated with said orifice for opening and closing same.

4. The valve defined in claim 3 wherein said diaphrgam assembly is pivotally mounted in said first chamber.

5. The valve defined in claim 3 wherein cam means is provided in said first chamber, said cam means being engageable with said diaphragm assembly after said exhaust port is opened to prevent said diaphragm assembly from closing said orifice.

6. The valve defined in claim 1 wherein biasing means is provided in said first chamber and associated with said diaphragm assembly for urging same away from said orifice upon termination of flow through said outlet port.

7. The valve defined in claim 1 wherein biasing means is provided in said second chamber and associated with said actuator for urging said valve element in a direction to close said exhaust port.

8. The valve defined in claim 3 wherein said diaphragm assembly includes a frame which is pivotally mounted in said first chamber and a resilient diaphragm carried by said frame.

9. A fast acting fluid responsive valve comprising a body having an inlet port, an outlet port and an exhaust port, a first chamber in said body to which said ports are connected, a second chamber in said body, a piston in said second chamber and including an extension extending into said first chamber, a valve element in said first chamber connected to said extension and associated with said exhaust port to open and close same, biasing means in said second chamber associated with said piston and urging same in a direction to hold said valve element against said exhaust port, an orifice in said body between said chambers, orifice control means mounted in said first chamber, said control means including a seal portion associated with said orifice for opening and closing same, biasing means in said first chamber associated with said control means for urging said seal portion away from said orifice, said control means being responsive to the initial flow of fluid in an explosive condition for urging said seal portion against said orifice to close same and thereby prevent the fluid from entering said second chamber, the fluid entering said inlet port exiting through said exhaust port until the flow terminates, the biasing means in said first chamber thereafter urging the seal portion of said control means away from said orifice to permit the fluid to enter said second chamber through said orifice and to exert a force on said piston effective to move said piston and valve element away from said exhaust port to permit the fluid to exit from said first chamber via said exhaust port.

10. The valve defined in claim 9 wherein cam means is carried by said extension in said first chamber, said cam means being engageable with said orifice control after said exhaust port is opened to prevent said seal portion from closing said orifice.

11. The valve defined in claim 9 wherein said orifice control means is in the form of a movable diaphragm assembly.

12. The valve defined in claim 11 wherein said diaphragm assembly includes a frame which is pivotally mounted in said first chamber and a resilient diaphragm carried by said frame.

13. The valve defined in claim 9 wherein each biasing means is in the form of a spring.

14. The valve defined in claim 9 wherein said piston divides said second chamber into upper and lower compartments, said orifice being located between said first chamber and said lower compartment, and the biasing means associated with said piston being located in said upper compartment.

15. The valve defined in claim 14 wherein said second compartment is provided with an atmospheric vent passage.

16. The valve defined in claim 9 wherein said body is provided with an upper housing and a lower housing which are secured together, said first chamber being located in said lower housing and said second chamber being located in said upper housing, said upper housing including a tubular sleeve extending from said second chamber into said first chamber, the extension of said piston being telescopically received in said sleeve.

References Cited

UNITED STATES PATENTS

| 3,224,456 | 12/1965 | Klein | 137—115 |
| 3,400,636 | 9/1968 | Schneider | 91—452 |

WILLIAM F. O'DEA, Primary Examiner

WILLIAM H. WRIGHT, Assistant Examiner

U.S. Cl. X.R.

91—452; 137—115, 119